United States Patent
Liu et al.

(10) Patent No.: US 10,476,807 B2
(45) Date of Patent: Nov. 12, 2019

(54) USER EQUIPMENT PROCESSING METHOD AND DEVICE

(71) Applicant: XI'AN ZHONGXING NEW SOFTWARE CO., LTD., Xi'An (CN)

(72) Inventors: Cangming Liu, Shenzhen (CN); Zheng Zhang, Shenzhen (CN); Huaibin Wang, Shenzhen (CN); Xianjin Hong, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 91 days.

(21) Appl. No.: 15/543,892

(22) PCT Filed: Jul. 21, 2015

(86) PCT No.: PCT/CN2015/084723
§ 371 (c)(1),
(2) Date: Jul. 14, 2017

(87) PCT Pub. No.: WO2016/115853
PCT Pub. Date: Jul. 28, 2016

(65) Prior Publication Data
US 2018/0013684 A1      Jan. 11, 2018

(30) Foreign Application Priority Data
Jan. 23, 2015 (CN) .......................... 2015 1 0036862

(51) Int. Cl.
*H04L 12/801* (2013.01)
*H04L 29/08* (2006.01)
(Continued)

(52) U.S. Cl.
CPC .......... *H04L 47/33* (2013.01); *H04L 12/1407* (2013.01); *H04L 29/08* (2013.01);
(Continued)

(58) Field of Classification Search
CPC ............................... H04L 47/33; H04L 67/16
See application file for complete search history.

(56) References Cited

U.S. PATENT DOCUMENTS

2004/0208151 A1* 10/2004 Haverinen .............. H04L 29/12
                                                                  370/338
2014/0376394 A1    12/2014 Akiyoshi et al.
(Continued)

FOREIGN PATENT DOCUMENTS

CN          104104520 A      10/2014
CN          104125191 A      10/2014
(Continued)

OTHER PUBLICATIONS

International Search Report re: Application No. PCT/CN2015/084723; pp. 1-3; citing CN 104104520 A, CN 104125191 A, CN 104378749 A, CN 104378250 A and CN 104468254 A and WO 2015009939 A1.
(Continued)

*Primary Examiner* — Jamal Javaid
(74) *Attorney, Agent, or Firm* — Cantor Colburn LLP

(57) ABSTRACT

A User Equipment (UE) processing method and device is provided. The method includes that: a forwarding device receives an indication message for managing a UE sent by a controller; and the forwarding device manages the UE according to the received indication message.

12 Claims, 5 Drawing Sheets

A forwarding device receives an indication message for managing a UE sent by a controller — S102

The forwarding device manages the UE according to the received indication message — S104

(51) Int. Cl.
    *H04L 12/14*     (2006.01)
    *H04M 15/00*     (2006.01)
    *H04W 4/24*     (2018.01)
    *H04W 76/25*     (2018.01)
    *H04L 12/717*     (2013.01)

(52) U.S. Cl.
    CPC ............ *H04L 67/16* (2013.01); *H04M 15/66* (2013.01); *H04W 4/24* (2013.01); *H04W 76/25* (2018.02); *H04L 45/42* (2013.01)

(56) References Cited

U.S. PATENT DOCUMENTS

2015/0003259 A1     1/2015     Gao
2016/0036597 A1     2/2016     Liu et al.

FOREIGN PATENT DOCUMENTS

| CN | 104378250 A | 2/2015 |
| CN | 104378749 A | 2/2015 |
| CN | 104468254 A | 3/2015 |
| WO | 2015009939 A1 | 1/2015 |

OTHER PUBLICATIONS

Supplementary European Search Report dated Aug. 28, 2018 re: Application No. 15878524.6, pp. 1-7, citing: US 2014/376394 A1, US 2016-036597 A1, CN 104 104 520 A and US 2015/003259 A1.

* cited by examiner

USER EQUIPMENT PROCESSING METHOD AND DEVICE

TECHNICAL FIELD

The present disclosure relates to the field of communications, and in particular to a User Equipment (UE) processing method and device.

BACKGROUND

With an arrival of age of cloud computing and big data, computing and storage in three core elements (computing, storage, and network) of the Information Communication Technology (ICT) system have been developing toward a direction of cloudization and virtualization. And a rigid network becomes the last obstacle on a way of an ICT system to march toward automatization and software orientation. In order to eliminate bottleneck constraints brought by a traditional network and complete the last piece of puzzle of the ICT system facing openness, a virtualization network, as a future development direction, has attracted more and more industry attentions. The currently popular Software Defined Network (SDN) is a typical virtualization network.

The SDN is an innovative network architecture proposed by a clean slate research group of Stanford University. A core technology OpenFlow of the SDN separates a control plane and a data plane of a network device, standardizes a forwarding device and centralizes the control plane so that all control functions are implemented by programming through the centralized control plane without need of upgrading a forwarding plane, so as to realize a flexible control of network flow and provide a good platform for an innovation of core networks and applications. A core concept of the SDN is that a control operation and a forwarding operation are separated, the forwarding device is standardized and simplified, the control plane is centralized, and all control functions are implemented by programming through the centralized control plane without need of upgrading the forwarding plane.

The SDN has global information, and optimizes at least one path based on the global information, so that a global demand responded slowly is satisfied fast through a new algorithm. The SDN has a uniform computing object and algorithm, which avoids a problem of too large impact on networks caused by upgrading routers one by one. The SDN provides a better application program interface through the definition of software, so that management of networks performed by applications is realized better. At the same time, the SDN simplifies complex requirements for the control plane and a management plane of a device, so that the device concentrates on forwarding, thereby improving a speed of technological innovation.

As an implementation mode of the SDN, an OpenFlow switch transforms an original packet forwarding process completely controlled by a switch or router into a process completed by an OpenFlow switch and a controller together, thereby realizing separation between data forwarding and routing control. The controller controls a flow table in the OpenFlow switch through an interface operation specified in advance, so as to achieve a purpose of controlling data forwarding. Therefore, OpenFlow opens a road of network innovation. The OpenFlow switch is composed of a flow table, a secure channel and an OpenFlow protocol. The network device maintains the flow table and performs forwarding according to the flow table. The flow table is generated, maintained and sent completely by an external controller. Network operators decide what granularity of flows to use. For example, the operators need to route according to a destination Internet Protocol (IP), then it is possible that the destination IP field in the flow table is effective, and the others are wildcard. The flow table is composed of many flow table items, and each flow table item is a forwarding rule. A data packet entering the switch obtains a destination port of forwarding and corresponding operations by querying the flow table.

The SDN or OpenFlow technology is leading a traditional and closed network toward openness. A majority of operators and manufactures have performed corresponding developing and pilot running work, and problems encountered have been posed step by step, and have been being discussed and solved. As one of network forwarding devices in the SDN, a management of a broadband user access device is an important component. A centralized management of users saves a great amount of device resources and maintenance resources, improves utilization rate, and realizes a more flexible manner of management of users. Keep-alive detection and management of the network forwarding device are realized from an SDN controller, but a management of a single user becomes a problem needing to be mainly solved. Tens of thousands and hundreds of thousands of users are carried on each network forwarding device. If a keep-alive detection and other management functions of the users are also realized by the controller, a great amount of controller resources and massive bandwidth are wasted, and even the normal running of network services is influenced.

Aiming at a problem in the related art that a great amount of resources are wasted in management of UE, an effective solution has not been provided yet.

SUMMARY

At least some embodiments of present disclosure provide a UE processing method and device, so as at least to partially solve a problem in the related art that a great amount of resources are wasted in management of UE.

In an embodiment of the present disclosure, a UE processing method is provided, which includes that: receiving, by a forwarding device, an indication message for managing a UE sent by a controller; and managing, by the forwarding device, the UE according to the received indication message.

In one embodiment, managing, by the forwarding device, the UE according to the received indication message includes at least one of the followings: performing, by the forwarding device, keep-alive detection to the UE; and billing, by the forwarding device, the UE.

In one embodiment, performing, by the forwarding device, the keep-alive detection to the UE includes: receiving, by the forwarding device, a first prompt message sent by the controller, wherein the first prompt message carries a keep-alive field for performing the keep-alive detection to the UE; judging, by the forwarding device, whether to perform the keep-alive detection to the UE according to the keep-alive field; and when determining, by the forwarding device, to perform the keep-alive detection to the UE according to the keep-alive field, performing, by the forwarding device, the keep-alive detection to the UE.

In one embodiment, when determining, by the forwarding device, to perform the keep-alive detection to the UE according to the keep-alive field, performing, by the forwarding device, the keep-alive detection to the UE includes: sending, by the forwarding device, an online detection packet to the UE according to a predetermined period defined in the keep-alive field, wherein the online detection packet is used for detecting whether the UE is online; when the forwarding device receives, in a predetermined time length, a response message for responding to the online detection packet sent by the UE, determining, by the forwarding device, that the UE is online; when the forwarding device does not receive the response message in the predetermined time length or an idle time length after the first prompt message is sent is more than an idle timeout value preset in the first prompt message, determining, by the forwarding device, that the UE is not online.

In one embodiment, after determining that the UE is not online, further including: sending, by the forwarding device, a first notification message carrying identity information of the UE to the controller, wherein the first notification message is used for notifying the controller to send a request message to a server according to the identity information, and the request message is used for requesting the server to release resources occupied by the UE and stop billing the UE after the UE is billed.

In one embodiment, billing, by the forwarding device, the UE includes: receiving, to by the forwarding device, a second prompt message sent by the controller, wherein the second prompt message carries a control word for billing the UE; judging, by the forwarding device, whether to bill the UE according to the control word; and when determining, by the forwarding device, to bill the UE according to the control word, billing, by the forwarding device, the UE.

In one embodiment, billing, by the forwarding device, the UE includes: sending, by the forwarding device, a second notification message carrying data information for billing the UE to the controller, wherein the second notification message is used for notifying the controller to send an update message to a server according to the data information, and the update message is used for requesting the server to update billing data of the UE.

In another embodiment of the present disclosure, another UE processing method is provided, which includes that: determining, by a controller, to manage a UE through a forwarding device; and sending, by the controller, an indication message for managing the UE to the forwarding device, wherein the indication message is used for indicating the forwarding device to manage the UE according to the received indication message.

In one embodiment, determining, by the controller, to manage the UE through the forwarding device includes at least one of the followings: determining, by the controller, to perform keep-alive detection to the UE through the forwarding device; and determining, by the controller, to bill the UE through the forwarding device.

In one embodiment, after determining, by the controller, to perform the keep-alive detection to the UE through the forwarding device, further including: sending, by the controller, a first prompt message to the forwarding device, wherein the first prompt message carries a keep-alive field for performing the keep-alive detection to the UE, and is used for prompting the forwarding device to perform the keep-alive detection to the UE when the forwarding device determines to perform the keep-alive detection to the UE according to the keep-alive field.

In one embodiment, after sending, by the controller, the first prompt message to the forwarding device, further including: receiving, by the controller, a first notification message sent by the forwarding device, wherein the first notification message carries identity information of the UE, and the first notification message is sent by the forwarding device after the forwarding device determines that the UE is not online; and sending, by the controller, a request message to a server according to the identity information, wherein the request message is used for requesting the server to release resources occupied by the UE.

In one embodiment, after determining, by the controller, to bill the UE through the forwarding device, further including: sending, by the controller, a second prompt message to the forwarding device, wherein the second prompt message carries a control word for billing the UE, and is used for prompting the forwarding device to bill the UE when the forwarding device determines to bill the UE according to the control word.

In one embodiment, after sending the second prompt message to the forwarding device, further including: receiving, by the controller, a second notification message carrying data information for billing the UE sent by the forwarding device; and sending, by the controller, an update message to a server according to the data information, wherein the update message is used for requesting the server to update billing data of the UE.

In another embodiment of the present disclosure, a UE processing device is provided, which is applied to the forwarding device, and includes: a receiving component to receive an indication message for managing a UE sent by a controller; and a managing component to manage the UE according to the received indication message.

In one embodiment, the managing component includes at least one of the followings: a keep-alive detection subcomponent to perform keep-alive detection to the UE; and a billing subcomponent to bill the UE.

In one embodiment, the keep-alive detection subcomponent includes: a first receiving element to receive a first prompt message sent by the controller, wherein the first prompt message carries a keep-alive field for performing the keep-alive detection to the UE; a first judging element to judge whether to perform the keep-alive detection to the UE according to the keep-alive field; and a keep-alive detection element to, when determining to perform the keep-alive detection to the UE according to the keep-alive field, perform the keep-alive detection to the UE.

In one embodiment, the keep-alive detection element includes: a first sending subelement to send an online detection packet to the UE according to a predetermined period defined in the keep-alive field, wherein the online detection packet is used for detecting whether the UE is online; a determining subelement to, when receiving a response message for responding to the online detection packet sent by the UE in a predetermined time length, determine that the UE is online; a stopping subelement to, when not receiving the response message in the predetermined time length or an idle time length after the first prompt message is sent is more than an idle timeout value preset in the first prompt message, determine that the UE is not online.

In one embodiment, the device further includes: a second sending subelement to send a first notification message carrying identity information of the UE to the controller, wherein the first notification message is used for notifying the controller to send a request message to a server according to the identity information, and the request message is used for requesting the server to release resources occupied by the UE and stop billing the UE after the UE is billed.

In one embodiment, the billing subcomponent includes: a second receiving element to receive a second prompt message sent by the controller, wherein the second prompt message carries a control word for billing the UE; a second judging element to judge whether to bill the UE according to the control word; and a billing element to, when determining to bill the UE according to the control word, bill the UE.

In one embodiment, the billing subcomponent includes: a sending element to send a second notification message carrying data information for billing the UE to the controller, wherein the second notification message is used for notifying the controller to send an update message to a server according to the data information, and the update message is used for requesting the server to update billing data of the UE.

In another embodiment of the present disclosure, another UE processing device is provided, which is applied to the controller, and includes: a determining component to determine to manage a UE through a forwarding device; and an sending component to issue an indication message for managing the UE to the forwarding device, wherein the indication message is used for indicating the forwarding device to manage the UE according to the received indication message.

In one embodiment, the determining component includes at least one of the followings: a first determining subcomponent to determine to perform keep-alive detection to the UE through the forwarding device; and a second determining subcomponent to determine to bill the UE through the forwarding device.

In one embodiment, the device further includes: a first sending subcomponent to send a first prompt message to the forwarding device, wherein the first prompt message carries a keep-alive field for performing the keep-alive detection to the UE, and is used for prompting the forwarding device to perform the keep-alive detection to the UE when the forwarding device determines to perform the keep-alive detection to the UE according to the keep-alive field.

In one embodiment, the device further includes: a first receiving subcomponent to receive a first notification message sent by the forwarding device, wherein the first notification message carries identity information of the UE, and the first notification message is sent by the forwarding device after the forwarding device determines that the UE is not online; and a second sending subcomponent to send a request message to a server according to the identity information, wherein the request message is used for requesting the server to release resources occupied by the UE.

In one embodiment, the device further includes: a sending subcomponent to send a second prompt message to the forwarding device, wherein the second prompt message carries a control word for billing the UE, and is used for prompting the forwarding device to bill the UE when the forwarding device determines to bill the UE according to the control word.

In one embodiment, the device further includes: a second receiving subcomponent to receive a second notification message carrying data information for billing the UE sent by the forwarding device; and a third sending subcomponent to send an update message to a server according to the data information, wherein the update message is used for requesting the server to update billing data of the UE.

According to some embodiments of the present disclosure, the forwarding device receives the indication message for managing the UE sent by the controller, and the forwarding device manages the UE according to the received indication message. In such a manner, the problem in the related art that a great amount of resources are wasted in management of UE is solved, thereby lightening the load on the network controller and saving massive network resources.

DETAILED DESCRIPTION

The present disclosure is elaborated below with reference to the accompanying drawings and embodiments. Note that, embodiments of the present disclosure and the characteristics in the embodiments can be combined under the condition of no conflicts.

Figure 1:
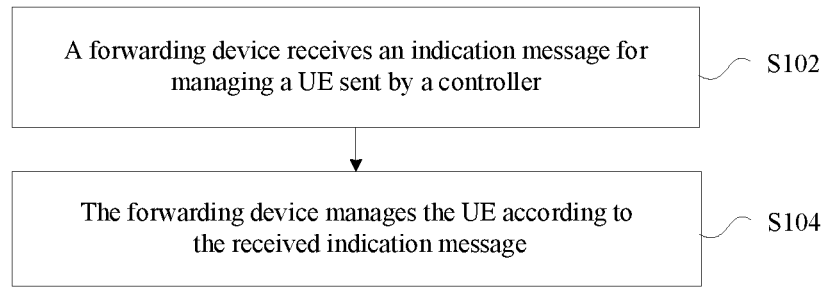
FIG. 1 is a flowchart of a UE processing method according to an embodiment of the present disclosure.

A UE processing method is provided in the present embodiment. FIG. 1 is a flowchart of a UE processing method according to an embodiment of the present disclosure. As shown in FIG. 1, the flow includes the following steps.

At step S102, a forwarding device receives an indication message for managing a UE sent by a controller.

At step S104, the forwarding device manages the UE according to the received indication message.

Through the above steps, the forwarding device receives the indication message for managing the UE sent by the controller and the forwarding device manages the UE according to the received indication message. In such a manner, the problem in the related art that a great amount of resources are wasted in management of UE is solved, thereby lightening the load on a network controller and saving massive network resources.

The step of the forwarding device manages the UE according to the received indication message includes at least one of the followings: the forwarding device performs keep-alive detection to the UE; and the forwarding device bills the UE.

The forwarding device performs the keep-alive detection to the UE in more than one way. In an optional embodiment, the forwarding device receives a first prompt message sent by the controller, and the first prompt message carries a keep-alive field for performing the keep-alive detection to the UE. The forwarding device judges whether to perform the keep-alive detection to the UE according to the keep-alive field and when the forwarding device determines to perform the keep-alive detection to the UE according to the keep-alive field, the forwarding device performs the keep-alive detection to the UE.

The forwarding device performs the keep-alive detection to the UE in many ways. In an optional embodiment, the forwarding device sends an online detection packet to the UE according to a predetermined period defined in the keep-alive field, and the online detection packet is used for detecting whether the UE is online. When receiving, in a predetermined time length, a response message for responding to the online detection packet sent by the UE, the forwarding device determines that the UE is online. When the forwarding device does not receive the response message in the predetermined time length or an idle time length after the first prompt message is sent is more than an idle timeout value preset in the first prompt message, the forwarding device determines that the UE is not online.

After the forwarding device determines that the UE is not online, the forwarding device sends a first notification message carrying identity information of the UE to the controller. And the first notification message is used for notifying the controller to send a request message to a server according to the identity information, and the request message is used for requesting the server to release resources occupied by the UE and stop billing the UE after the UE is billed.

The forwarding device bills the UE in more than one way. In an optional embodiment, the forwarding device receives a second prompt message sent by the controller, and the second prompt message carries a control word for billing the UE. The forwarding device judges whether to bill the UE according to the control word. When determining to bill the UE according to the control word, the forwarding device bills the UE.

The way of billing the UE by the forwarding device include that: the forwarding device sends a second notification message carrying data information for billing the UE to the controller. The second notification message is used for notifying the controller to send an update message to a server according to the data information, and the update message is used for requesting the server to update billing data of the UE.

Figure 2:
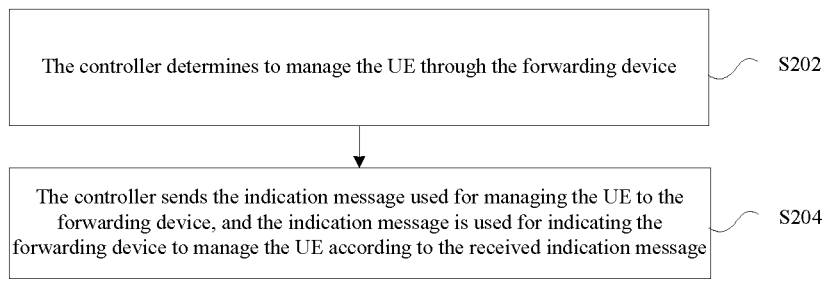
FIG. 2 is a flowchart of another UE processing method according to an embodiment of the present disclosure.

The present disclosure also provides another UE processing method. FIG. 2 is a flowchart of another UE processing method according to an embodiment of the present disclosure. As shown in FIG. 2, the flow includes the following steps.

At step S202, the controller determines to manage the UE through the forwarding device.

At step S204, the controller sends the indication message used for managing the UE to the forwarding device, and the indication message is used for indicating the forwarding device to manage the UE according to the received indication message.

Through the above steps, the controller determines to manage the UE through the forwarding device, and the controller sends the indication message used for managing the UE to the forwarding device, and the indication message is used for indicating the forwarding device to manage the UE according to the received indication message. In such a manner, the problem in the related art that a great amount of resources are wasted in management of UE is solved, thereby lightening the load on a network controller and saving massive network resources.

That the controller determines to manage the UE through the forwarding device includes at least one of the followings: the controller determines to perform the keep-alive detection to the UE through the forwarding device; and the controller determines to bill the UE through the forwarding device.

After the controller determines to perform the keep-alive detection to the UE through the forwarding device, the controller sends the first prompt message to the forwarding device. The first prompt message carries the keep-alive field for performing the keep-alive detection to the UE, and is used for prompting the forwarding device to perform the keep-alive detection to the UE when the forwarding to device determines to perform the keep-alive detection to the UE according to the keep-alive field.

After the controller sends the first prompt message to the forwarding device, the controller receives the first notification message sent by the forwarding device. The first notification message carries the identity information of the UE, and the first notification message is sent by the forwarding device after the forwarding device determines that the UE is not online. The controller sends the request message to the server according to the identity information, and the request message is used for requesting the server to release the resources occupied by the UE.

After the controller determines to bill the UE through the forwarding device, the controller sends the second prompt message to the forwarding device, and the second prompt message carries the control word for billing the UE, and is used for prompting the forwarding device to bill the UE when the forwarding device determines to bill the UE according to the control word.

After the second prompt message is sent to the forwarding device, the controller receives the second notification message carrying data information for billing the UE sent by the forwarding device. The controller sends the update message to a server according to the data information, and the update message is used for requesting the server to update the billing data of the UE.

Figure 3:
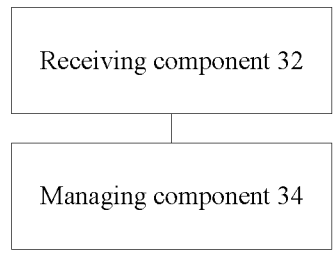
FIG. 3 is a block diagram of a UE processing device according to an embodiment of the present disclosure.

The present disclosure also provides a UE processing device, which is applied to the forwarding device. FIG. 3 is a block diagram of a UE processing device according to an embodiment of the present disclosure. As shown in FIG. 3, the device includes:

a receiving component 32 to receive the indication message for managing the UE sent by the controller; and a managing component 34 to manage the UE according to the received indication message.

Figure 4:
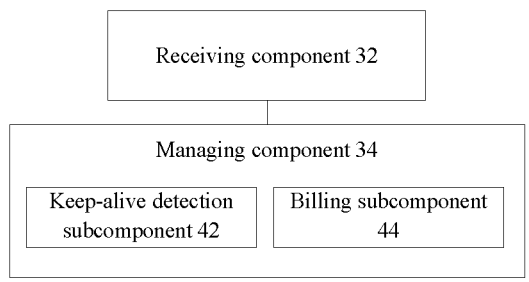
FIG. 4 is a block diagram of a UE processing device according to a first exemplary embodiment of the present disclosure.

FIG. 4 is a block diagram of a UE processing device according to a first exemplary embodiment of the present disclosure. As shown in FIG. 4, the managing component 34 includes at least one of the followings:

a keep-alive detection subcomponent 42 to perform the keep-alive detection to the UE; and a billing subcomponent 44 to bill the UE.

Figure 5:
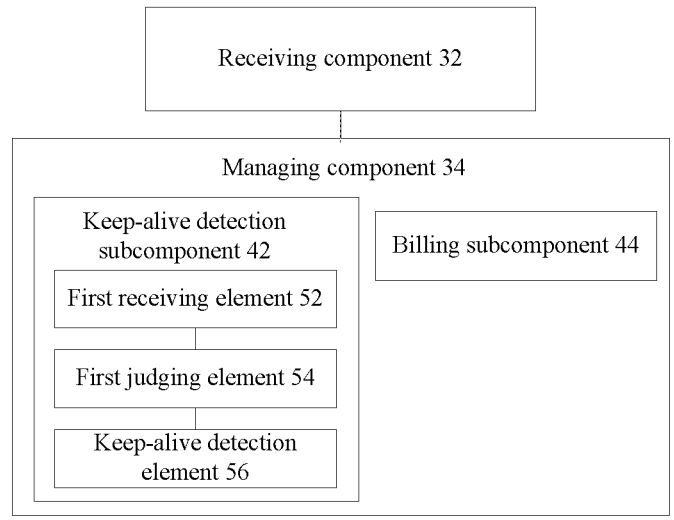
FIG. 5 is a block diagram of a UE processing device according to a second exemplary embodiment of the present disclosure.

FIG. 5 is a block diagram of a UE processing device according to an exemplary embodiment of the present disclosure. As shown in FIG. 5, the keep-alive detection subcomponent 42 includes:

a first receiving element 52 to receive the first prompt message sent by the controller, and the first prompt message carries the keep-alive field for performing the keep-alive detection to the UE;

a first judging element 54 to judge whether to perform the keep-alive detection to the UE according to the keep-alive field; and a keep-alive detection element 56 to, when determining to perform the keep-alive detection to the UE according to the keep-alive field, perform the keep-alive detection to the UE.

The keep-alive detection element 56 includes: a first sending subelement to send the online detection packet to the UE according to the predetermined period defined in the keep-alive field, and the online detection packet is used for detecting whether the UE is online; a determining subelement to, when receiving a response message for responding to the online detection packet sent by the UE in a predetermined time length, determine that the UE is online, and determine to bill the UE; a stopping subelement to, when not receiving the response message in the predetermined time length or an idle time length after the first prompt message is sent is more than the idle timeout value preset in the first prompt message, determine that the UE is not online and stop billing the UE.

Furthermore, the device further includes: a second sending subelement to send the first notification message carrying identity information of the UE to the controller, and the first notification message is used for notifying the controller to send the request message to the server according to the identity information, and the request message is used for requesting the server to release the resources occupied by the UE.

Figure 6:
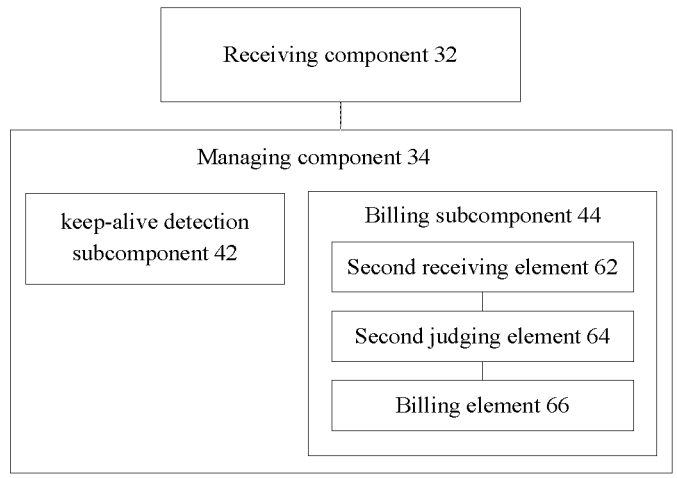
FIG. 6 is a block diagram of a UE processing device according to a third exemplary embodiment of the present disclosure.

FIG. 6 is a block diagram of a UE processing device according to a third exemplary embodiment of the present disclosure. As shown in FIG. 6, the billing subcomponent 44 includes:

a second receiving element 62 to receive the second prompt message sent by the controller, and the second prompt message carries the control word for billing the UE;

a second judging element 64 to judge whether to bill the UE according to the control word; and a billing element 66 to, when determining to bill the UE according to the control word, bill the UE.

Furthermore, the billing subcomponent 44 includes: a sending element to send the second notification message carrying data information for billing the UE to the controller, and the second notification message is used for notifying the controller to send the update message to a server according to the data information, and the update message is used for requesting the server to update billing data of the UE.

Figure 7:
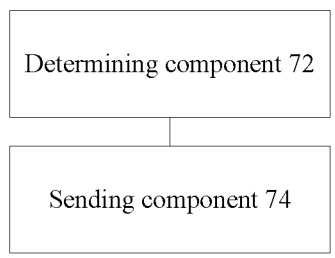
FIG. 7 is a block diagram of another UE processing device according to an embodiment of the present disclosure.

The present disclosure also provides another UE processing device, which is applied to the controller. FIG. 7 is a block diagram of another UE processing device according to an embodiment of the present disclosure. As shown in FIG. 7, the device includes:

a determining component 72 to determine to manage the UE through the forwarding device; and an sending component 74 to issue the indication message for managing the UE to the forwarding device, and the indication message is used for indicating the forwarding device to manage the UE according to the received indication message.

The determining component 72 includes at least one of the followings: a first determining subcomponent to determine to perform the keep-alive detection to the UE through the forwarding device; and a second determining subcomponent to determine to bill the UE through the forwarding device.

Furthermore, the device further includes: a first sending subcomponent to send the first prompt message to the forwarding device, and the first prompt message carries the keep-alive field for performing the keep-alive detection to the UE, and is used for prompting the forwarding device to perform the keep-alive detection to the UE when the forwarding device determines to perform the keep-alive detection to the UE according to the keep-alive field.

Furthermore, the device further includes: a first receiving subcomponent to receive the first notification message sent by the forwarding device, and the first notification message carries the identity information of the UE, and the first notification message is sent by the forwarding device after the forwarding device determines that the UE is not online; and a second sending subcomponent to send the request message to the server according to the identity information, and the request message is used for requesting the server to release the resources occupied by the UE.

Furthermore, the device further includes: a sending subcomponent to issue the second prompt message to the forwarding device, and the second prompt message carries the control word for billing the UE, and is used for prompting the forwarding device to bill the UE when the forwarding device determines to bill the UE according to the control word.

Furthermore, the device further includes: a second receiving subcomponent to receive the second notification message carrying the data information for billing the UE sent by the forwarding device; and a third sending subcomponent to send the update message to a server according to the data information, and the update message is used for requesting the server to update the billing data of the UE.

Figure 8:
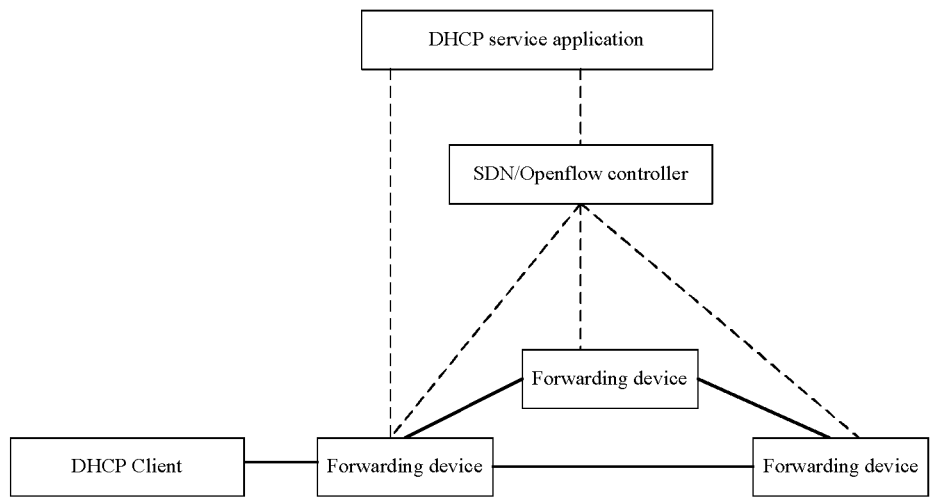
FIG. 8 is a schematic diagram of a Dynamic Host Configuration Protocol (DHCP) broadband user access device according to an exemplary embodiment of the present disclosure.

FIG. 8 is a schematic diagram of a DHCP broadband user access device according to an exemplary embodiment of the present disclosure. As shown in FIG. 8, the device includes: a DHCP client, a forwarding device, an SDN or OpenFlow controller, and a DHCP service application. The DHCP client is a form of the UE, and the UE is also a PPPoE client and a DHCPv6 client. The forwarding device is at least one of a router and a switch. The present disclosure is further elaborated below by taking that the UE is the DHCP client, the PPPoE client and the DHCPv6 client for example.

The embodiment of the present disclosure is further elaborated below by taking that the indication message is the flow table item for example. By extending the flow table item sent by a virtualized network controller, a field of keep-alive time length value is added in the flow table item. The forwarding device receives the flow table item sent by the controller, and decides whether to actively send the online detection packet to a broadband access UE according to the keep-alive time length value in the flow table item. When the broadband access UE responds to the online detection packet, the forwarding device determines that the broadband access UE is online. When the broadband access UE does not respond to the online detection packet, the forwarding device determines that the broadband access UE is offline, and notifies the virtualized controller. Then, the controller notifies the broadband access service application, and the broadband access service application stops billing the broadband access user and releases the resources occupied by the broadband access UE.

The added field is the field added in the flow table item that the virtualized controller sends to the forwarding device. The added field serves as the keep-alive time length value, and the virtualized controller decides whether to issue the field according to the processing of broadband access service application. The added keep-alive time length value is identified and processed on the forwarding device. The forwarding device judges the keep-alive time length value sent by the controller, and decides whether to perform the keep-alive detection to the UE according to the keep-alive time length value. When the forwarding device performs the keep-alive detection to the user according to the keep-alive time length value, if the user does not respond to the detection packet or the accumulated value of time of not sending flows exceeds the existing time length of timeout field in the flow table, the forwarding device determines that the UE has been offline When determining that the UE has been offline, the forwarding device deletes the user item in the flow table, and sends the notification message to the controller. The notification message carries key word information of the user offline. After receiving a message about the user offline, the virtualized network controller notifies the broadband access service application. Then, the broadband access service application finds the user according to the deleted user information, performs offline processing to the user, stops billing the user and releases the occupied resources. The virtualized network includes, but is not limited to, the SDN network.

For the broadband access service application, the used broadband user access protocols include, but are not limited to, the DHCP, the PPPoE, and so on. The broadband access service application completes authentication, authorization, billing and other related works to the broadband access user.

Note that, the detection packet that the forwarding device sends to the broadband access UE includes, but is not limited to, an Address Resolution Protocol (ARP), an Echo Request packet of the PPPoE, and so on.

Through the optional embodiment, it is possible to detect an offline situation of a broadband UE in the first place, and notify the controller to release the corresponding user resources in time, thereby greatly lightening the load on the virtualized network controller and avoiding a huge waste of bandwidth caused by that the broadband UE detects a great amount of users through the controller.

By extending the flow table item sent by the virtualized network controller, the field of keep-alive time length value is added in the flow table item. The keep-alive time length value exists in the flow table item that the virtualized network controller sends to the forwarding device. And the forwarding device decides whether to actively send the detection packet according to the keep-alive time length value. After the idle time of the flow table item is out, and the forwarding device deletes the idle flow table item, the forwarding device notifies the virtualized network controller, and then the controller notifies the broadband access service application. The broadband access service application extracts the key word from information of the deleted flow table item, finds the user information, stops billing the user and releases the occupied resources.

Figure 9:
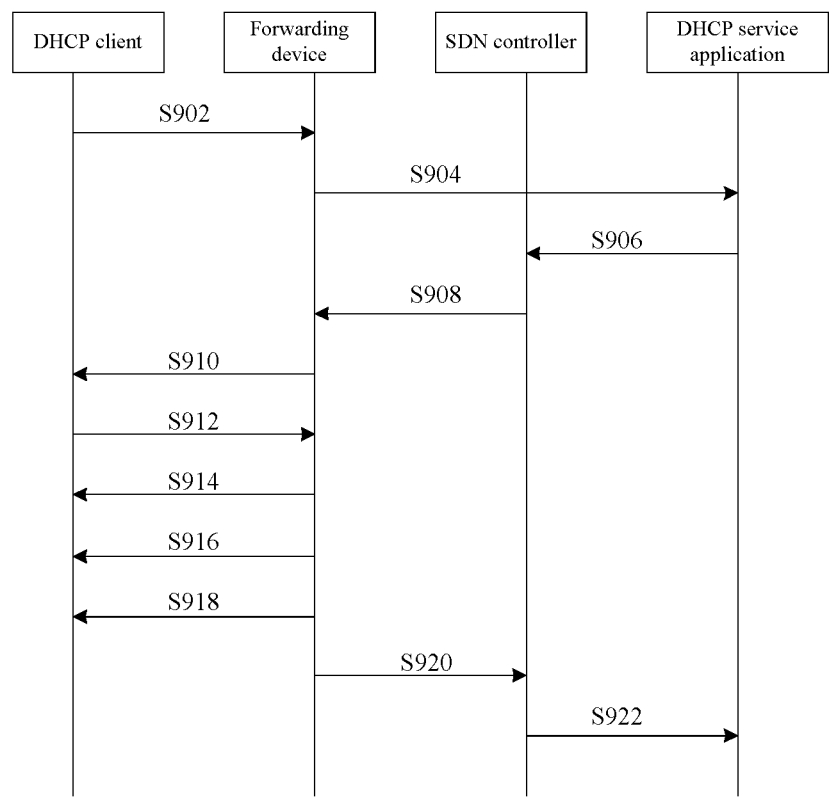
FIG. 9 is a flowchart of DHCP broadband user access according to an exemplary embodiment of the present disclosure.

FIG. 9 is a flowchart of DHCP broadband user access according to an exemplary embodiment of the present disclosure. As shown in FIG. 9, the DHCP broadband access includes the following steps.

At step S902, the DHCP client sends a DHCP protocol packet to the forwarding device.

At step S904, the DHCP protocol packet is sent to a DHCP service application through the forwarding device.

At step S906, the DHCP service application notifies an SDN controller to send the flow table item.

At step S908, the SDN controller communicates with the forwarding device through an OpenFlow protocol, and sends the flow table item. The content in the flow table item includes an Ethernet type (0x0806), an ARP operation code (2), an ARP source IP address (the IP address that the DHCP service application allocates to the DHCP client), an ARP source Media Access Control (MAC) address (a hardware address of the DHCP client device), the idle timeout value of the flow table item, and the keep-alive time length value.

At step S910, the forwarding device decides, according to the keep-alive time length value in the flow table item, whether to actively send the detection packet. If the keep-alive time length value is 0, the forwarding device does not actively send the detection packet; or else, the forwarding device sends an ARP request packet once at the time defined by the keep-alive time length value. The destination IP address of the ARP request packet is set as the ARP source IP address defined in the flow table item, namely the IP address that the DHCP service application allocates to the DHCP client.

At step S912, if the DHCP client device receives the ARP request packet sent by the forwarding device, the DHCP client returns a response. The Ethernet type in an ARP response packet is 0x0806, the value of the ARP operation code is 2, the ARP source IP address is the IP address allocated by the DHCP service application, and the ARP source MAC address is the hardware address of the DHCP client device. After receiving the ARP response packet sent by the DHCP client, the forwarding device finds the flow table, and matches the flow table items in the flow table. The idle time related to the flow table item is cleared, so the flow table item will not be deleted by the forwarding device because the flow table item is idle to timeout.

At step S914-S918, the forwarding device sends the ARP request packet once at the time defined by the keep-alive time length value. If the DHCP client is offline abnormally, no response is given. Because the forwarding device does not receive the response packet all the time, the idle time will exceed the idle timeout value set in the flow table item because there is no packet matching for long time.

At step S920, when the idle time of the flow table item exceeds the idle timeout value set in the flow table item, the forwarding device deletes the flow table item, and notifies the SDN controller of the content of the deleted flow table item.

At step S922, the SDN controller extracts information about the source IP address and the source MAC address in the deleted flow table item, and notifies the DHCP service application of the information. The DHCP service application finds the user according to the information about the source IP address and the source MAC address, releases the resources occupied by the user, and stops billing the user.

The scenario diagram of the PPPoE broadband user access is similar to the scenario diagram of the DHCP broadband user access, so it will not be repeated here.

Figure 10:
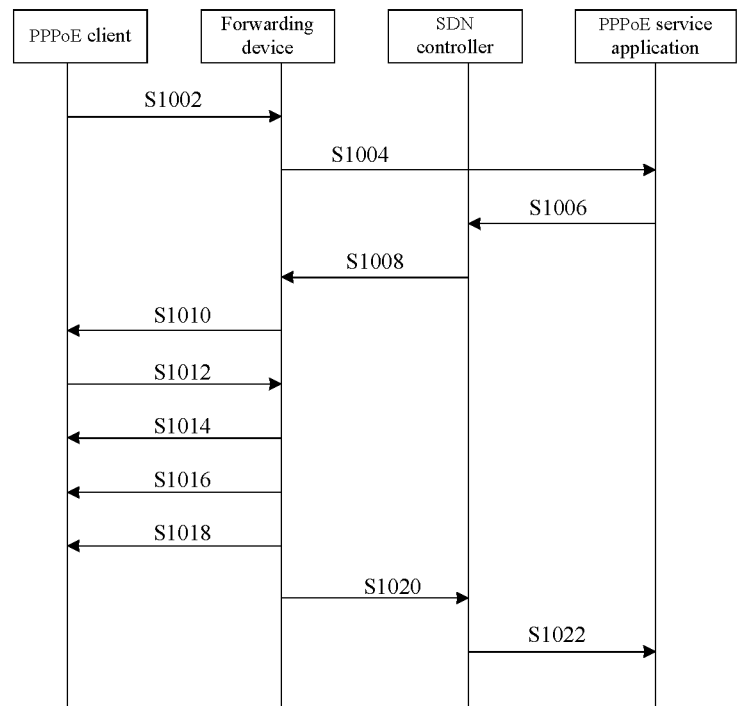
FIG. 10 is a flowchart of Point-to-Point Protocol over Ethernet (PPPoE) broadband user access according to an exemplary embodiment of the present disclosure.

FIG. 10 is a flowchart of PPPoE broadband user access according to an exemplary embodiment of the present disclosure. As shown in FIG. 10, the PPPoE broadband user access includes the following steps.

At step S1002, the PPPoE client sends a PPPoE protocol packet to the forwarding device.

At step S1004, the PPPoE protocol packet is sent to a PPPoE service application through the forwarding device.

At step S1006, the PPPoE service application notifies the SDN controller to issue the flow table item.

At step S1008, the SDN controller communicates with the forwarding device through the OpenFlow protocol, and sends the flow table item. The content in the to flow table item includes the Ethernet type (0x0806), a device source MAC address, the idle timeout value of the flow table item, and the keep-alive time length value.

At step S1010, the forwarding device decides, according to the keep-alive time length value in the flow table item, whether to actively send the detection packet. If the keep-alive time length value is 0, the forwarding device does not actively send the detection packet; or else, the forwarding device sends an Echo Request packet defined in the PPPoE protocol once at the time defined by the keep-alive time length value. The destination MAC address in the packet is set as the device source MAC address in the flow table item.

At step S1012, if the PPPoE client device receives the Echo Request packet sent by the forwarding device, the PPPoE client gives a response. The Ethernet type in an Echo Reply packet is 0x8864, and the source MAC address is the MAC address of the PPPoE client device. After receiving the Echo Reply packet sent by the PPPoE client, the forwarding device finds the flow table, and matches the flow table items in the flow table. The idle time related to the flow table item is cleared, so the flow table item will not be deleted by the forwarding device because the flow table item is idle to timeout.

At step S1014-S1018, the forwarding device sends the Echo Request packet once at the time defined by the keep-alive time length value. If the PPPoE client is offline abnormally, no response is given. Because the forwarding device does not receive the response packet all the time, the idle time will exceed the idle timeout value set in the flow table item because there is no packet matching for long time.

At step S1020, when the idle time of the flow table item exceeds the idle timeout value set in the flow table item, the forwarding device deletes the flow table item, and notifies the SDN controller of the content of the deleted flow table item.

At step S1022, the SDN controller extracts information about the source MAC address in the deleted flow table item, and notifies the PPPoE service application of the information. The PPPoE service application finds the user according to the information about the MAC address, releases the resources occupied by the user, and stops billing the user.

Figure 11:
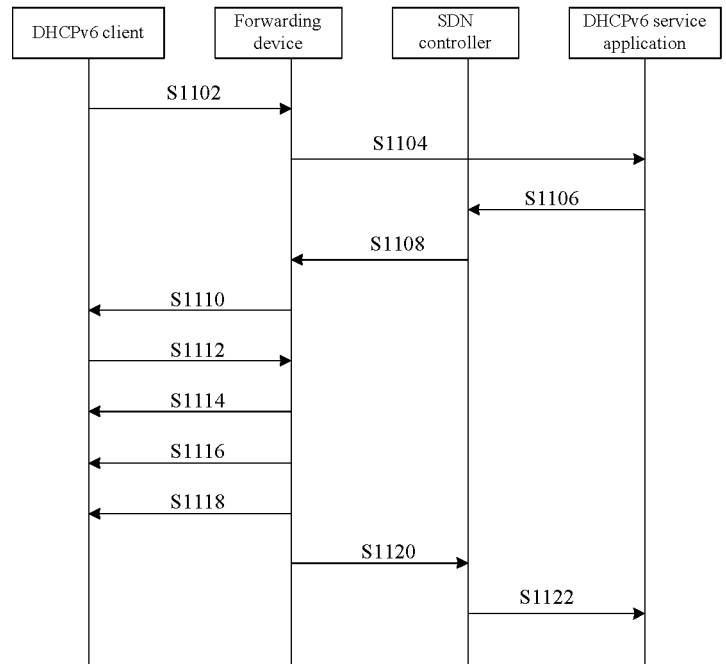
FIG. 11 is a flowchart of DHCPv6 broadband user access according to an exemplary embodiment of the present disclosure.

FIG. 11 is a flowchart of DHCPv6 broadband user access according to an exemplary embodiment of the present disclosure. As shown in FIG. 11, the DHCPv6 broadband user access includes the following steps.

At step S1102, the DHCPv6 client sends a DHCPv6 protocol packet to the forwarding device.

At step S1104, the DHCPv6 protocol packet is sent to a DHCPv6 service application through the forwarding device.

At step S1106, the DHCPv6 service application notifies the SDN controller to issue the flow table item.

At step S1108, the SDN controller communicates with the forwarding device through the OpenFlow protocol, and sends the flow table item. The content in the flow table item includes the Ethernet type (0x86dd), a source IPv6 address (the IPv6 address that the DHCPv6 service application allocates to the DHCPv6 client), an IP protocol number (58), an ICMPv6 type (129), the idle timeout value of the flow table item, and the keep-alive time length value.

At step S1110, the forwarding device decides, according to the keep-alive time length value in the flow table item, whether to actively send the detection packet. If the keep-alive time length value is 0, the forwarding device does not actively send the detection packet; or else, the forwarding device sends the Echo Request packet defined by the ICMPv6 once at the time defined by the keep-alive time length value. The destination IPv6 address of the Echo Request packet is set as the source IPv6 address defined in the flow table item, namely the IPv6 address that the DHCPv6 service application allocates to the DHCPv6 client.

At step S1112, if the DHCPv6 client device receives the Echo Request packet sent by the forwarding device, the DHCPv6 client returns a response. The Ethernet type in the Echo Reply packet is 0x86dd, the source IPv6 address is the IPv6 address allocated by the DHCPv6 service application. The IP protocol number is 58, and the ICMPv6 type is 129. After receiving the Echo Reply packet sent by the DHCPv6 client, the forwarding device finds the flow table, and matches the flow table items in the flow table. The idle time related to the flow table item is cleared, so the flow table item will not be deleted by the forwarding device because the flow table item is idle to timeout.

At step S1114-S1118, the forwarding device sends the Echo Request packet once at the time defined by the keep-alive time length value. If the DHCPv6 client is offline abnormally, no response is given. Because the forwarding device does not receive the response packet all the time, the idle time will exceed the idle timeout value set in the flow table item because there is no packet matching for long time.

At step S1120, when the idle time of the flow table item exceeds the idle timeout value set in the flow table item, the forwarding device deletes the flow table item, and notifies the SDN controller of the content of the deleted flow table item.

At step S1122, the SDN controller extracts information about the source IPv6 address in the deleted flow table item, and notifies the DHCPv6 service application of the information. The DHCPv6 service application finds the user according to the information about the IPv6 address, releases the resources occupied by the user, and stops billing the user.

Figure 12:
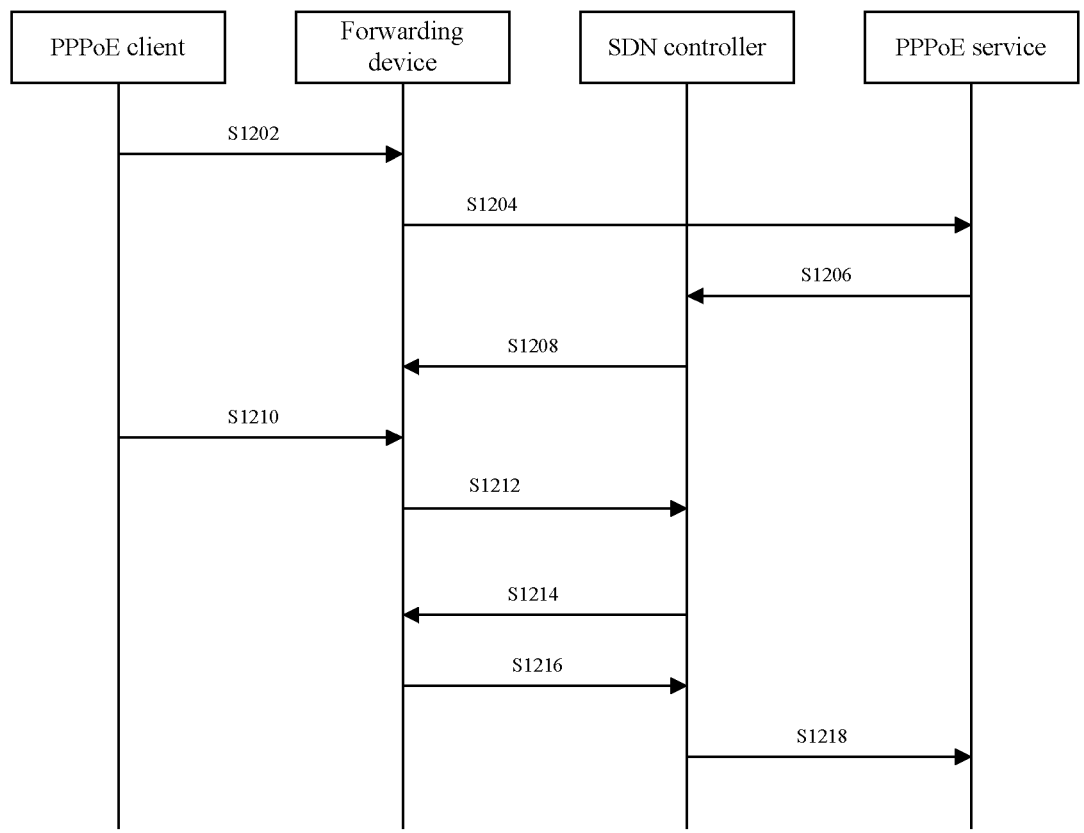
FIG. 12 is a flowchart of billing a user according to an exemplary embodiment of the present disclosure.

FIG. 12 is a flowchart of billing a PPPoE broadband user according to an exemplary embodiment of the present disclosure. As shown in FIG. 12, billing a PPPoE broadband user includes the following steps.

At step S1202, the PPPoE client sends the PPPoE protocol packet to the forwarding device.

At step S1204, the PPPoE protocol packet is sent to the PPPoE service application through the forwarding device.

At step S1206, the PPPoE service application notifies the SDN controller to issue the flow table item.

At step S1208, the SDN controller communicates with the forwarding device through the OpenFlow protocol, sends the flow table item to indicate that the SDN controller is needed to billing the user.

At step S1210, the forwarding device records the user management information according to network data information of the user.

At step S1212, the forwarding device reports the management information record periodically.

At step S1214-S1216, when receiving a request for billing information of the user from the SDN controller, the forwarding device reports the billing information of the user.

At step S1218, the SDN controller notifies the PPPoE service application, and then the PPPoE service application updates the replied billing information of the user.

To sum up, by sending the field of keep-alive time length added in the flow table to the virtualized network controller, the forwarding device can detect the offline situation of the broadband UE in the first place, and notify the controller to release the corresponding user resources in time. By sending on the forwarding device the billing information of the broadband UE to the network controller periodically or according to needs, the load of a large amount of users on the virtualized network controller is lightened greatly, and a huge waste of bandwidth caused by detecting the broadband UE and billing a large amount of users by the controller is avoided.

Obviously, those skilled in the art should appreciate that the above components and steps of the present disclosure can be implemented by a general-purpose computing device, and they can be centralized in a single computing device or distributed on a network composed of multiple computing devices. Optionally, they can be implemented by a program code which is capable of being executed by the computing device, so that they can be stored in a storage device and executed by the computing device. And in some situations, the presented or described steps can be executed in an order different from that described here; or they are made into integrated circuit components, respectively; or multiple components and steps of them are made into a single integrated circuit component to realize. In this way, the present disclosure is not limited to any particular combination of hardware and software.

The above are only the exemplary embodiments of the present disclosure and not intended to limit the present disclosure. For those skilled in the art, the present disclosure may have various modifications and changes. Any modifications, equivalent replacements, improvements and the like within the scope as claimed in claims of the present disclosure shall fall within the scope of protection of the present disclosure.

INDUSTRIAL APPLICABILITY

By applying the present disclosure to the field of communications, the problem in the related art that a great amount of resources are wasted in management of UE is solved, thereby lightening the load on a network controller and saving massive network resources.

What is claimed is:

1. A User Equipment (UE) processing method, comprising:
receiving, by a forwarding device, an indication message for managing a UE sent by a controller; and
managing, by the forwarding device, the UE according to the received indication message;
wherein managing, by the forwarding device, the UE according to the received indication message comprises at least one of the following:
performing, by the forwarding device, keep-alive detection to the UE; and
billing, by the forwarding device, the UE;
wherein performing, by the forwarding device, the keep-alive detection to the UE comprises: receiving, by the forwarding device, a first prompt message sent by the controller, wherein the first prompt message carries a keep-alive field for performing the keep-alive detection to the UE; judging, by the forwarding device, whether to perform the keep-alive detection to the UE according to the keep-alive field; and when determining, by the forwarding device, to perform the keep-alive detection to the UE according to the keep-alive field, performing, by the forwarding device, the keep-alive detection to the UE;
or billing, by the forwarding device, the UE comprises: receiving, by the forwarding device, a second prompt message sent by the controller, wherein the second prompt message carries a control word for billing the UE; judging, by the forwarding device, whether to bill the UE according to the control word; and when determining, by the forwarding device, to bill the UE according to the control word, billing, by the forwarding device, the UE.

2. The method as claimed in claim 1, wherein when determining, by the forwarding device, to perform the keep-alive detection to the UE according to the keep-alive field, performing, by the forwarding device, the keep-alive detection to the UE comprises:
sending, by the forwarding device, an online detection packet to the UE according to a predetermined period defined in the keep-alive field, wherein the online detection packet is used for detecting whether the UE is online;
when the forwarding device receives, in a predetermined time length, a response message for responding to the online detection packet sent by the UE, determining, by the forwarding device, that the UE is online;
when the forwarding device does not receive the response message in the predetermined time length or an idle time length after the first prompt message is sent is more than an idle timeout value preset in the first prompt message, determining, by the forwarding device, that the UE is not online.

3. The method as claimed in claim 2, wherein after determining that the UE is not online, further comprising:
sending, by the forwarding device, a first notification message carrying identity information of the UE to the controller, wherein the first notification message is used for notifying the controller to send a request message to a server according to the identity information, and the request message is used for requesting the server to release resources occupied by the UE and stop billing the UE after the UE is billed.

4. The method as claimed in claim 1, wherein billing, by the forwarding device, the UE comprises:
sending, by the forwarding device, a second notification message carrying data information for billing the UE to the controller, wherein the second notification message is used for notifying the controller to send an update message to a server according to the data information, and the update message is used for requesting the server to update billing data of the UE.

5. A User Equipment (UE) processing method, comprising:
determining, by a controller, to manage a UE through a forwarding device; and
sending, by the controller, an indication message for managing the UE to the forwarding device, wherein the indication message is used for indicating the forwarding device to manage the UE according to the received indication message;
wherein determining, by the controller, to manage the UE through the forwarding device comprises at least one of the following:
determining, by the controller, to perform keep-alive detection to the UE through the forwarding device; and
determining, by the controller, to bill the UE through the forwarding device;
wherein after determining, by the controller, to perform the keep-alive detection to the UE through the forwarding device, further comprising: sending, by the controller, a first prompt message to the forwarding device, wherein the first prompt message carries a keep-alive field for performing the keep-alive detection to the UE, and is used for prompting the forwarding device to perform the keep-alive detection to the UE when the forwarding device determines to perform the keep-alive detection to the UE according to the keep-alive field;
or after determining, by the controller, to bill the UE through the forwarding device, further comprising: sending, by the controller, a second prompt message to the forwarding device, wherein the second prompt message carries a control word for billing the UE, and is used for prompting the forwarding device to bill the UE when the forwarding device determines to bill the UE according to the control word.

6. The method as claimed in claim 5, wherein after sending, by the controller, the first prompt message to the forwarding device, further comprising:
receiving, by the controller, a first notification message sent by the forwarding device, wherein the first notification message carries identity information of the UE, and the first notification message is sent by the forwarding device after the forwarding device determines that the UE is not online; and
sending, by the controller, a request message to a server according to the identity information, wherein the request message is used for requesting the server to release resources occupied by the UE.

7. The method as claimed in claim 5, wherein after sending the second prompt message to the forwarding device, further comprising:
receiving, by the controller, a second notification message carrying data information for billing the UE sent by the forwarding device; and
sending, by the controller, an update message to a server according to the data information, wherein the update message is used for requesting the server to update billing data of the UE.

8. A User Equipment (UE) processing device, which is applied to a forwarding device, comprising: a hardware processor, configured to perform programming components stored in a memory, wherein the programming components comprise:
a receiving component to receive an indication message for managing a UE sent by a controller; and
a managing component to manage the UE according to the received indication message;
wherein the managing component comprises at least one of the following:
a keep-alive detection subcomponent to perform keep-alive detection to the UE; and
a billing subcomponent to bill the UE;
wherein the keep-alive detection subcomponent comprises: a first receiving element to receive a first prompt message sent by the controller, wherein the first prompt message carries a keep-alive field for performing the keep-alive detection to the UE; a first judging element to judge whether to perform the keep-alive detection to the UE according to the keep-alive field; and a keep-alive detection element to, when determining to perform the keep-alive detection to the UE according to the keep-alive field, perform the keep-alive detection to the UE;
or the billing subcomponent comprises: a second receiving element to receive a second prompt message sent by the controller, wherein the second prompt message carries a control word for billing the UE; a second judging element to judge whether to bill the UE according to the control word; and a billing element to, when determining to bill the UE according to the control word, bill the UE.

9. The device as claimed in claim 8, wherein the keep-alive detection element comprises:
a first sending subelement to send an online detection packet to the UE according to a predetermined period defined in the keep-alive field, wherein the online detection packet is used for detecting whether the UE is online; a determining subelement to, when receiving a response message for responding to the online detection packet sent by the UE in a predetermined time length, determine that the UE is online; a stopping subelement to, when not receiving the response message in the predetermined time length or an idle time length after the first prompt message is sent is more than an idle timeout value preset in the first prompt message, determine that the UE is not online;
or the billing subcomponent comprises: a sending element to send a second notification message carrying data information for billing the UE to the controller, wherein the second notification message is used for notifying the controller to send an update message to a server according to the data information, and the update message is used for requesting the server to update billing data of the UE.

10. The device as claimed in claim 9, wherein further comprising:
a second sending subelement to send a first notification message carrying identity information of the UE to the controller, wherein the first notification message is used for notifying the controller to send a request message to a server according to the identity information, and the request message is used for requesting the server to release resources occupied by the UE and stop billing the UE after the UE is billed.

11. A User Equipment (UE) processing device, which is applied to a controller, comprising: a hardware processory, configured to perform programming components stored in a memory, wherein the programming components comprise:
a determining component to determine to manage a UE through a forwarding device; and
an sending component to issue an indication message for managing the UE to the forwarding device, wherein the indication message is used for indicating the forwarding device to manage the UE according to the received indication message;
wherein the determining component comprises at least one of the following:
a first determining subcomponent to determine to perform keep-alive detection to the UE through the forwarding device; and
a second determining subcomponent to determine to bill the UE through the forwarding device;
wherein further comprising:
a first sending subcomponent to send a first prompt message to the forwarding device, wherein the first prompt message carries a keep-alive field for performing the keep-alive detection to the UE, and is used for prompting the forwarding device to perform the keep-alive detection to the UE when the forwarding device determines to perform the keep-alive detection to the UE according to the keep-alive field;
or further comprising: a sending subcomponent to send a second prompt message to the forwarding device, wherein the second prompt message carries a control word for billing the UE, and is used for prompting the forwarding device to bill the UE when the forwarding device determines to bill the UE according to the control word.

12. The device as claimed in claim 11, wherein further comprising:
a first receiving subcomponent to receive a first notification message sent by the forwarding device, wherein the first notification message carries identity information of the UE, and the first notification message is sent by the forwarding device after the forwarding device determines that the UE is not online; and a second sending subcomponent to send a request message to a server according to the identity information, wherein the request message is used for requesting the server to release resources occupied by the UE;
or further comprising: a second receiving subcomponent to receive a second notification message carrying data information for billing the UE sent by the forwarding device; and a third sending subcomponent to send an update message to a server according to the data information, wherein the update message is used for requesting the server to update billing data of the UE.

* * * * *